United States Patent
Taoka et al.

(10) Patent No.: US 9,130,616 B2
(45) Date of Patent: Sep. 8, 2015

(54) WEIGHTING FACTOR REPORTING METHOD IN A MIMO MOBILE COMMUNICATIONS SYSTEM, AND BASE STATION AND USER APPARATUS THAT ARE SUITABLE FOR USE IN THE METHOD

(75) Inventors: Hidekazu Taoka, Tokyo (JP); Nobuhiko Miki, Yokohama (JP); Kenichi Higuchi, Saitama (JP); Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 728 days.

(21) Appl. No.: 12/810,637

(22) PCT Filed: Dec. 26, 2008

(86) PCT No.: PCT/JP2008/073774
§ 371 (c)(1),
(2), (4) Date: Sep. 14, 2010

(87) PCT Pub. No.: WO2009/087933
PCT Pub. Date: Jul. 16, 2009

(65) Prior Publication Data
US 2011/0013719 A1    Jan. 20, 2011

(30) Foreign Application Priority Data
Jan. 8, 2008  (JP) ................................. 2008-001665

(51) Int. Cl.
*H04L 27/00* (2006.01)
*H04B 7/04* (2006.01)
(Continued)

(52) U.S. Cl.
CPC ............ *H04B 7/0417* (2013.01); *H04B 7/0639* (2013.01); *H04B 1/7115* (2013.01); *H04B 2201/709709* (2013.01)

(58) Field of Classification Search
CPC ................................. H04B 7/06; H04L 27/00
USPC .................................................. 375/260, 267
See application file for complete search history.

(56) References Cited

U.S. PATENT DOCUMENTS

2008/0214198 A1*  9/2008  Chen et al. .................... 455/450
2008/0233902 A1*  9/2008  Pan et al. ................... 455/114.3
(Continued)

FOREIGN PATENT DOCUMENTS

WO        2007/113923 A1     10/2007

OTHER PUBLICATIONS

3GPP TS 36.213 V8.0.0, Sep. 2007, "Evolved Universal Terrestrial Radio Access (E-UTRA);" p. 11: "Section 7.2 UE procedure for reporting channel quality indication (CQI), precoding matrix indicator (PMI) and rank," 2 pages.
(Continued)

Primary Examiner — Jaison Joseph
(74) Attorney, Agent, or Firm — Osha Liang LLP

(57) ABSTRACT

A user apparatus in a multi input multi output (MIMO) mobile communications system using pre-encoding is disclosed. The user apparatus includes a PMI generator which generates a pre-encoding matrix indicator (PMI) which indicates a pre-encoding matrix to be used by a base station; a transmitter which feeds back the PMI to the base station; and a receiver which receives a signal from the base station, wherein the signal received at the receiver includes information on whether it is according to PMI information fed back from the user apparatus after a predetermined elapsed time from a timing at which the PMI information is fed back from the user apparatus.

13 Claims, 9 Drawing Sheets

(51) Int. Cl.
*H04B 7/06* (2006.01)
*H04B 1/7115* (2011.01)

(56) References Cited

U.S. PATENT DOCUMENTS

| | | | | |
|---|---|---|---|---|
| 2008/0260058 | A1* | 10/2008 | Li | 375/260 |
| 2008/0260059 | A1* | 10/2008 | Pan | 375/260 |
| 2008/0305745 | A1* | 12/2008 | Zhang et al. | 455/67.11 |
| 2009/0046805 | A1* | 2/2009 | Kim et al. | 375/295 |
| 2009/0190528 | A1* | 7/2009 | Chung et al. | 370/328 |
| 2009/0279512 | A1 | 11/2009 | Fujishima et al. | |
| 2010/0183085 | A1* | 7/2010 | Taoka et al. | 375/260 |

OTHER PUBLICATIONS

Sharp, "Clarification of CQI/PMI/rank reporting mechanisms on PUCCH/PUSCH," 3GPP TSG RAN WG1 Meeting #51, R1-074661, Nov. 5-9, 2007, 3 pages.
NTT DoCoMo, et al., "Investigation on PMI Indication Schemes for Single-User MIMO Precoding in E-UTRA Downlink," 3GPP TSG RAN WG1 Meeting #51, R1-074820 (original R1-074285), Nov. 5-9, 2007, 6 pages.
International Search Report issued in PCT/JP2008/073774, mailed on Apr. 21, 2009, with translation, 11 pages.
Written Opinion issued in PCT/JP2008/073774, mailed on Apr. 21, 2009.
Japanese Office Action for Application No. 2008-001665, mailed on Aug. 31, 2010 (4 pages).
NTT DoCoMo, et al., Investigation on PMI Indication Schemes for Single-User MIMO Precoding in E-UTRA Downlink, 3GPP TSG RAN WG1 #51 R1-075057, Nov. 5-9, 2007.
Motorola, PMI Downlink Signaling and PDCCH Format, 3GPP TSG RAN WG1 #50 R1-073378, Aug. 20-24, 2007.
Motorola, CQI Feedback Schemes for E-UTRA,, 3GPP TSG RAN WG1 #51 R1-074611, Nov. 5-9, 2007.
Extended European Search Report in counterpart European Patent Application No. 08870210.5, mailed Jun. 6, 2014 (5 pages).
Extended Search Report issued in corresponding European Application No. 14183711.2, mailed Oct. 15, 2014 (6 pages).
Office Action issued in corresponding Korean Application No. 10-2010-7014157, mailed Aug. 29, 2014 (7 pages).
Motorola; "E-UTRA Precoding Feedback Overhead"; 3GPP TSG RAN WG1 Meeting #49, R1-072175; Kobe, Japan; May 7-11, 2007 (4 pages).
InterDigital Communications Corporation; "Binary Differential Feedback Scheme for Downlink MIMO Pre-Coding for E-UTRA"; 3GPP TSG RAN WG1 Meeting #49, R1-072366; Kobe, Japan; May 7-11, 2007 (14 pages).
LG Electronics; "Investigation on tradeoff between PMI overhead and performance" 3GPP TSG RAN WG1 Meeting #51, R1-074747; Jeju, Korea; Nov. 5-9, 2007 (6 pages).
LG Electronics; "Performance Evaluation of MIMO-related Dedicated Control Signaling"; 3GPP TSG RAN WG1 Meeting #49bis, R1-072885; Orlando, USA; Jun. 25-29, 2007 (5 pages).

* cited by examiner

WEIGHTING FACTOR REPORTING METHOD IN A MIMO MOBILE COMMUNICATIONS SYSTEM, AND BASE STATION AND USER APPARATUS THAT ARE SUITABLE FOR USE IN THE METHOD

BACKGROUND OF THE INVENTION

1. Field of the Invention

The present invention generally relates to MIMO (multi input multi output) mobile communications systems, and more particularly relates to weighting factor reporting methods in MIMO, and base stations and user apparatuses that are suitable for use in the methods.

2. Description of the Related Art

A multiple input and multiple output (MIMO) communications scheme is known which uses multiple antennas between a base station and a user apparatus. In this scheme, a directional beam may be utilized which is formed by multiplying multiple streams, generated by duplicating a signal stream to be transmitted, with weighting factors corresponding to the streams, making it possible to improve transmission speed and quality of a transmission signal. The weighting factor used here is called a pre-encoding vector or a pre-encoding matrix.

SUMMARY OF THE INVENTION

Problems to be Solved by the Invention

In the above scheme, the user apparatus sets a pre-encoding matrix based on a measurement of a common reference signal, generates pre-encoding matrix indicator (PMI) information which indicates the content of this pre-encoding matrix, and transmits (feeds back) the generated PMI information to the base station. This feedback is performed periodically using a physical uplink control channel (PUCCH), or performed using a physical uplink shared channel (PUSCH) in response to a request from the base station. Moreover, the PMI information includes information on a wideband PMI (a PMI common to the whole bandwidth) which indicates the whole bandwidth allowed for a communications system, and information on a PMI for each sub-band within the bandwidth (a frequency selective PMI) (See 3GPP, R1-074820, "Investigation on PMI Indication Schemes for Single-User MIMO Pre-encoding in E-UTRA Downlink", for example.) The common channel may be called a data channel.

The base station utilizes the PMI information received from the user apparatus to process a signal to be transmitted to the user apparatus, and utilizes a directional beam suitable for the user apparatus to transmit the signal. In this way, in a scheme utilizing the PMI information, it is necessary for the PMI information to be shared by the base station and the user apparatus, so that, when the PMI information is updated with a change in a radio propagation condition, the updated PMI information also has to be shared between the two.

However, depending on the radio propagation condition, the base station may erroneously receive the PMI information fed back from the user apparatus, so that the PMI information may not be shared between the base station and the user apparatus. In this case, the base station ends up using PMI information which is different from the fed back PMI information, and the user apparatus ends up receiving a signal processed using PMI information which is different from PMI information fed back by itself, making it not possible to properly process a downlink shared channel.

In order to solve the problems as described above, by using an error correcting codes such as a cyclic redundancy check (CRC) code, for example, it becomes possible for the base station to accurately receive at a significantly high probability, the PMI information fed back from the user apparatus.

However, as a result of investigation by the present inventors, it has been demonstrated that, even in a condition such that the PMI information fed back is accurately received, the PMI information used may not match between the base station and the user apparatus. Moreover, between the base station and the user apparatus, it may also be necessary to share more suitable PMI information.

The object of the present invention is to provide a method of facilitating an effective use of PMI information in MIMO communications involving a feedback of PMI information and a base station and a user apparatus that are suitable for use in the method.

Means for Solving the Problem

A first mode of the present invention provides a user apparatus in a multi-input multi-output (MIMO) mobile communications system using pre-encoding, including a PMI generator which generates, in accordance with a radio propagation condition, a pre-encoding matrix indicator (PMI) which indicates a pre-encoding matrix to be used by a base station; a delay circuit which takes, as an input, the PMI and which outputs the PMI after a predetermined delay period has elapsed; an accumulating unit which takes, as an input, the PMI from the delay circuit and stores the input PMI; and a channel estimator which, on a signal from the base station, performs channel estimation using the PMI stored in the accumulating unit.

A second mode of the present invention provides the user apparatus of the first mode, wherein the predetermined delay period is provided from the base station via high-layer signaling.

A third mode of the present invention provides a base station in a MIMO mobile communications system using pre-encoding, including a first accumulating unit which stores first PMI information fed back from a user apparatus using a physical uplink control channel; and a second accumulating unit which stores second PMI information fed back from the user apparatus using a physical uplink shared channel.

A fourth mode of the present invention provides the base station of the third mode, further including a selector which determines a time order of the first PMI information feedback and the second PMI information feedback, selects one of the first PMI information stored in the first accumulating unit and the second PMI information stored in the second accumulating unit based on the determination.

A fifth mode of the present invention provides the base station of the fourth mode, wherein, assuming an elapsed time from a feedback of the first PMI information of T1, and an elapsed time from a feedback of the second PMI information of T2, when a value of L, where $$L = a^{T1} - b^{T2}$$

$0 < a < 1$ and $0 < b < 1$, is no less than 0, the selector selects the first PMI information, and, when the value of L is less than 0, the selector selects the second PMI information.

A sixth mode of the present invention provides the base station of the third mode, wherein, based on a result of comparison of first channel quality information of a first channel used in feeding back the first PMI information and second channel quality information of a second channel used in feeding back the second PMI information, the selector selects one of the first PMI information stored in the first accumulating unit and the second PMI information stored in the second accumulating unit.

A seventh mode of the present invention provides a base station in a MIMO mobile communications system using pre-encoding, including a request adjusting unit which requests, from a user apparatus, an aperiodic PMI feedback such that the aperiodic PMI feedback from the user apparatus to the base station is performed within a predetermined timeframe including a time of a periodic feedback from the user apparatus to the base station.

An eighth mode of the present invention provides a communications method in a MIMO mobile communications system using pre-encoding, including the steps of generating, in accordance with a radio propagation condition, a PMI which indicates a pre-encoding matrix to be used by a base station; storing the PMI after a predetermined delay period has elapsed; and performing, on a signal from the base station, channel estimation using the PMI stored.

A ninth mode of the present invention provides the communications method of the eighth mode, further including the step of providing the predetermined delay period via high-layer signaling from the base station.

A tenth mode of the present invention provides a communications method in a MIMO mobile communications system using pre-encoding, including the steps of storing first PMI information fed back from a user apparatus using a physical uplink control channel; and storing second PMI information fed back from the user apparatus using a physical uplink shared channel.

An eleventh mode of the present invention provides the communications method of the tenth mode, further including the step of determining a time order of the first PMI information feedback and the second PMI information feedback, and selecting one of the first PMI information stored in a first accumulating unit and the second PMI information stored in a second accumulating unit based on the determination.

A twelfth mode of the present invention provides the communications method of the eleventh mode, further including the step of, assuming an elapsed time from a feedback of the first PMI information of T1, and an elapsed time from a feedback of the second PMI information of T2, when a value of L, where $$L = a^{T1} - b^{T2}$$

$0 < a < 1$ and $0 < b < 1$, is no less than 0, selecting the first PMI information, and, when the value of L is less than 0, selecting the second PMI information.

A thirteenth mode of the present invention provides the communications method of the tenth mode, further including the step of, based on a result of comparison of first channel quality information of a first channel used in feeding back the first PMI information and second channel quality information of a second channel used in feeding back the second PMI information, selecting one of the first PMI information stored in a first accumulating unit and the second PMI information stored in a second accumulating unit.

A fourteenth mode of the present invention provides a communications method in a MIMO mobile communications system using pre-encoding, comprising the step of requesting, from a user apparatus, an aperiodic PMI feedback such that the aperiodic PMI feedback from the user apparatus to a base station is performed within a predetermined timeframe including a time of a periodic feedback from the user apparatus to the base station.

Advantage of the Invention

The present invention makes it possible to provide a method of facilitating an effective use of PMI information in MIMO communications involving feedback of PMI information and a base station and a user apparatus that are suitable for use in the method.

DESCRIPTION OF THE PREFERRED EMBODIMENTS

[Description of Notations]
  10 user apparatus
  40, 70 base station
  112 PMI selecting and CQI estimating unit
  114 delay circuit
  116 PMI accumulating unit for demodulation
  118 PMI arithmetic unit for demodulation
  120 channel estimator
  408 demodulator/decoder
  410 modulation scheme/encoding rate selector
  422 PM multiplying unit
  432 unit for accumulating control channel feedback PMI, CQI, and frame number
  434 unit for accumulating data channel feedback PMI, CQI, and frame number
  436 PMI/CQI selector
  708 demodulator/decoder
  710 modulation scheme/encoding rate selector
  732 unit for accumulating PMI and CQI common to whole bandwidth
  734 frequency selective PMI and CQI accumulating unit; and
  736 PMI/CQI selector

BEST MODE OF CARRYING OUT THE INVENTION

With reference to the drawings, preferred embodiments of the present invention are described below. In the figures for explaining the embodiments, those elements having the same or corresponding function use the same or corresponding letter, so that repetitive explanations are omitted.

First Embodiment

Figure 1:
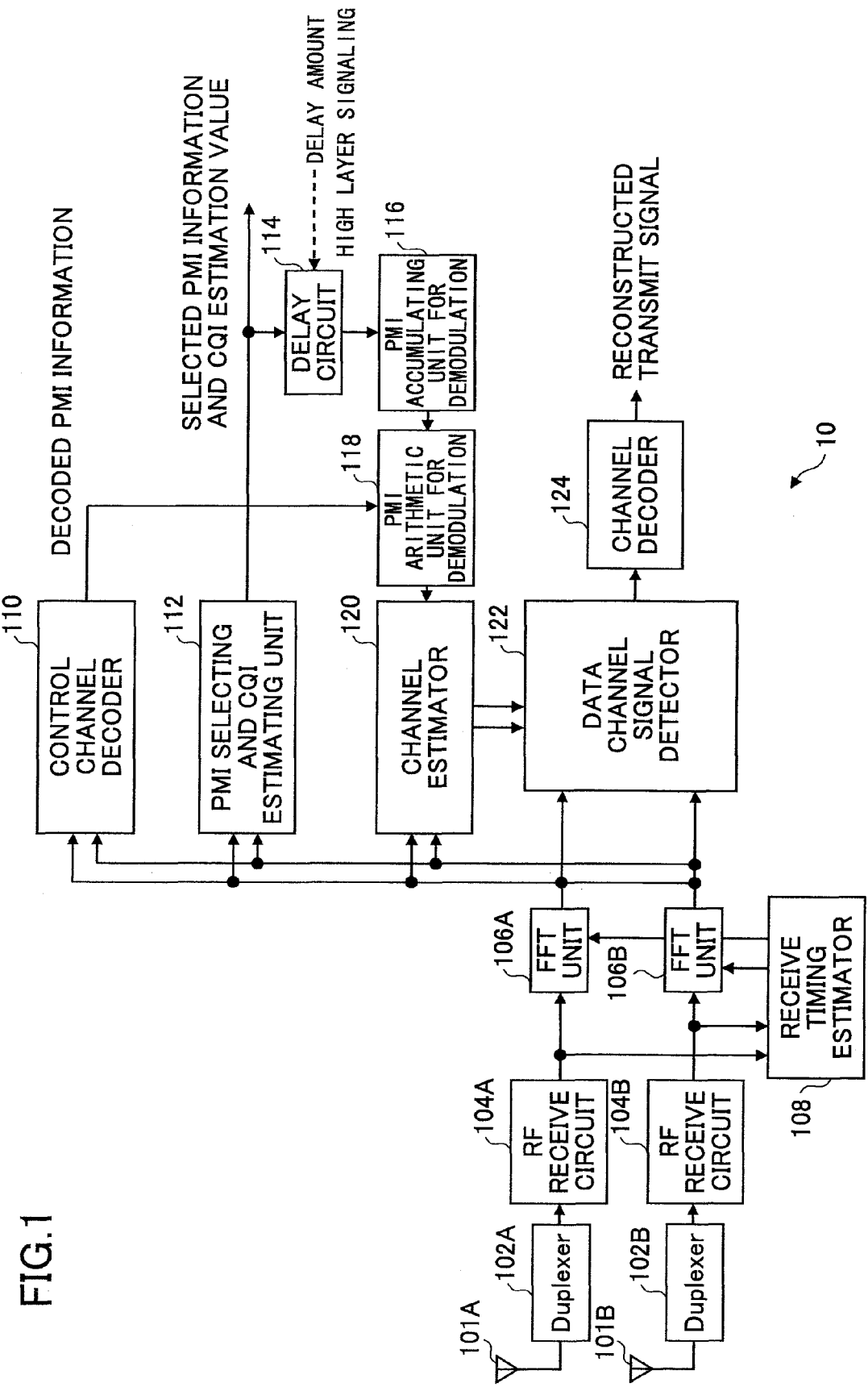
FIG. 1 is an overview configuration diagram of a user apparatus according to a first embodiment of the present invention.

First, with reference to FIG. 1, a user apparatus according to a first embodiment of the present invention is described. As shown, the user apparatus 10 includes a two receive antenna system having two antennas 101A, 102B.

The user apparatus 10 has duplexers 102A, 102B; RF receive circuits 104A, 104B; FFT units 106A, 106B; a receive timing estimator 108; a control channel decoder 110; a PMI selecting and CQI estimating unit 112; a delay circuit 114; a PMI accumulator for demodulation 116; a PMI arithmetic unit for demodulation 118; a channel estimator 120; a data channel signal detector 122; and a channel decoder 124.

The RF receive circuit 104A (104B) receives a signal from a base station via the receive antenna 101A (101B) and the duplexer 102A (102B), and performs, on the received signal, a predetermined signal process for converting to a base band digital signal. The signal process may include power amplification, bandwidth limiting, and analog-to-digital conversion, for example. Moreover, the RF receive circuit 104A (104B) outputs the signal-processed received signal to the FFT unit 106A (106B) and to the receive timing estimator 108.

The receive timing estimator 108 estimates a receive timing of the signal-processed received signal that is input from the RF receive circuit 104A and 104B. For this estimation, a cyclic prefix (CP) added at the base station may be utilized. The estimated receive timing is reported to the FFT units 106A and 106B.

Based on the receive timing reported from the receive timing estimator 108, the FFT unit 106A (106B) Fourier transforms the received signal input from the RF receiving circuit 104A (104B). Moreover, the FFT unit 106A (106B) outputs a Fourier-transformed received signal to the control channel decoder 110, the PMI selecting and CQI estimating unit 112, the channel estimator 120, and the data channel signal detector 122.

The control channel decoder 110 takes the Fourier-transformed received signal from the FFT unit 106A (106B) and decodes a control channel included in the received signal to extract data on PMI information used by the base station at the time of signal transmission. These data are needed for demodulating the received signal. More specifically, these data indicate whether the PMI information used at the base station is PMI information fed back from the user apparatus, or an explicit PMI number of the PMI information when different PMI information is used. For the explicit PMI number, the user apparatus 10 uses not the fed back PMI information, but PMI information reported from the base station to perform channel estimation on the received signal from the base station. The explicit PMI number is reported in a case such that, for various reasons, the base station had to use PMI information different from the PMI information fed back from the user apparatus 10. Except for such a rather irregular case, the fact that the fed back PMI information is being followed is reported. The control channel decoder 110 outputs extracted PMI information to the PMI arithmetic unit 118.

The PMI selecting and CQI estimating unit 112 uses a reference signal within a received signal input from an FFT unit 106A (106B) to measure a received quality, generate a channel quality indicator (CQI), and set (select) PMI information. In this way, a PMI suitable for the radio propagation status at that time is generated. Moreover, the PMI selecting and CQI estimating unit 112 outputs, to the delay circuit 114, the PMI information generated and the CQI set.

The delay circuit 114 takes, as an input, the PMI information from the PMI selecting and CQI estimating unit 112 and obtains a predetermined delay amount through high-layer signaling, for example, from the base station. Moreover, the delay circuit 114 delays the input PMI information by a predetermined delay amount for outputting to the PMI accumulating unit for demodulation 116.

The PMI accumulating unit for demodulation 116 takes, as an input, the PMI information from the delay circuit 114, and stores the input PMI information. Moreover, the PMI accumulating unit for demodulation 116 may output the stored PMI information to the PMI arithmetic unit for demodulation 118.

The PMI arithmetic unit for demodulation 118 takes, as an input, the PMI information from the control channel decoder 110 and determines PMI information to be used for demodulation based on the input PMI information. If the PMI information indicates that the PMI information fed back by the user apparatus has been used at the base station, the PMI arithmetic unit for demodulation 118 obtains PMI information from the PMI accumulating unit for demodulation 116. When the PMI information is an explicit PMI number, the PMI arithmetic unit for demodulation 118 calculates PMI information to be used for demodulation based on the PMI number. Moreover, the PMI arithmetic unit for demodulation 118 outputs obtained or calculated PMI information to the channel estimator 120.

The channel estimator 120 performs channel estimation on the Fourier-transformed received signal input from the FFT units 106A and 106B using the PMI information input from the PMI arithmetic unit for demodulation and outputs the result to the data channel signal detector 122.

The data channel signal detector 122 demodulates a signal input from the FFT unit 106A and 106B using a channel estimation result input from the channel estimator 120. The demodulated signal, which is output from the data channel signal detector 122, is input into the channel decoder 124.

The channel decoder 124 performs channel decoding on the demodulated signal input from the data channel signal detector 122 to reconstruct a signal transmitted from the base station.

Next, one example is described of communications between a user apparatus 10 and the base station according to a first embodiment of the present invention. In order to explain advantages achieved by the user apparatus 10, transmission and reception between the base station and a user apparatus not having a configuration of the user apparatus 10 in a pre-encoding MIMO system, as a comparison, is explained with reference to FIG. 2. In the explanation below, PMI information reported from the base station to a user apparatus indicates that it is in accordance with PMI information fed back from the user apparatus.

Figure 2:
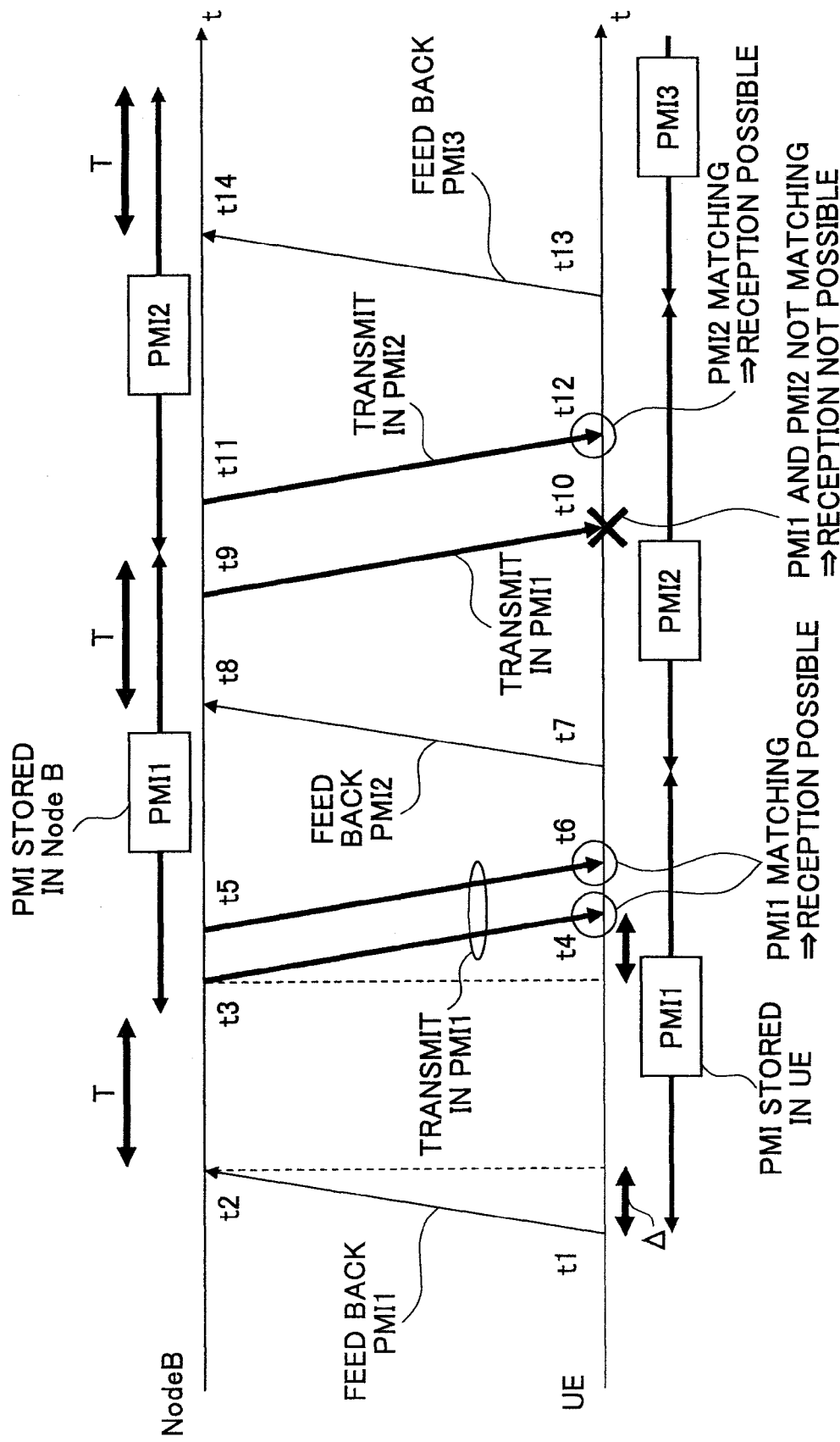
FIG. 2 is a time chart schematically illustrating communications between the user apparatus and a base station.

As illustrated in FIG. 2, first, at a time t1, a PMI 1 is fed back from a user apparatus (UE) to abase station (Node B). The PMI1 is generated, prior to the feedback, as a pre-encoding matrix indicator to indicate a pre-encoding matrix suitable for downlink that is determined by the user apparatus based on a received quality of a reference signal within a received signal received from the base station. Moreover, the user apparatus stores a PMI1 in a PMI accumulating unit for demodulation that is within the user apparatus at the same time it transmits the PMI1. The PMI1 stored in the PMI accumulating unit is subsequently referred to when the user apparatus receives data from the base station to use in a process such as data decoding, etc.

When the base station receives a PMI1 at a time t2 which is a predetermined delay Δ after time t1, it decodes the received PMI1 to obtain the pre-encoding matrix. The pre-encoding matrix has added an indicator PMI1 so as to be stored in the PMI accumulating unit within the base station. Here, as various processes including the decoding of the PMI1 are performed, a time T needed for the various processes elapses from receiving the PMI1 to storing the PMI1.

Next, the base station, at a time t3, transmits a signal to a user apparatus which fed back the PMI1. Thereupon, the base station refers to the PMI accumulating unit to obtain the PMI1 to be used in transmitting to this user apparatus, and weights each stream of a signal to be transmitted using a pre-encoding matrix corresponding to the PMI1. Thereafter, the base station performs predetermined signal processes such as signal multiplexing to transmit the signal to the user apparatus.

Next, at a time t4 which is a predetermined delay Δ after a time (the time t3) at which the base station has transmitted the signal, the user apparatus receives the signal. The user apparatus uses the PMI1 stored in its own PMI accumulating unit to decode the signal. In this case, PMI information used in the base station is PMI1, and the PMI information used in the user apparatus is also PMI1, so that a normal reception is conducted.

Moreover, when the base station transmits signals to the same user apparatus at a time t5, the PMI1 is stored (as PMI information for the user apparatus) within the PMI accumulating unit of the base station, weighting using the PMI1 is performed, after which the signal is transmitted to the user apparatus. As in the above, as the user apparatus is also aware that the PMI information to be used is PMI1, a normal reception is performed.

At a time t7, the process continues in which the user apparatus feeds back a PMI2, which is different from the PMI1. A change (update) from the PMI1 to the PMI2 is what has become necessary due to a change in a radio propagation condition, etc., where the PMI2 is the PMI information which has been determined to be optimal by the user apparatus at that time. Moreover, the user apparatus stores the PMI2 in its own PMI accumulating unit almost at the same time it transmits the PMI2. The feedback of the PMI information may be performed periodically using the PUCCH, or may be performed using the PUSCH in response to a request from the base station.

At a time t8 which is a predetermined delay Δ after the time t7, the PMI2 fed back is received at the base station. Thereafter, the PMI2 is decoded, etc., and a time T after receiving the PMI2, the PMI2 is stored in the PMI accumulating unit of the base station.

After the PMI information in the PMI accumulating unit of the base station is updated to the PMI2, the PMI2 is used for weighting to transmit from the base station to the user apparatus. For example, the PMI2 is used at the base station and also at the user apparatus when transmission is conducted from the base station at a time t11 and reception is conducted at the user apparatus at a time t12. Thus, the user apparatus succeeds in the reception.

However, when the base station transmits a signal to the user apparatus before a time T elapses after receiving the PMI2, the PMI1 is used since the PMI1 is still being stored in the PMI accumulating unit of the base station. In the meantime, the user apparatus which receives the signal has the PMI2 stored in its own PMI accumulating unit, so that the received signal is demodulated using the PMI2. In this way, PMI information used at the base station and PMI information used at the user apparatus are different, so that the user apparatus cannot properly process the signal. In other words, there is a problem that, when the base station transmits before the PMI information update has been completed, a mismatch of the PMI information occurs between the base station and the user apparatus.

Then, how this problem is overcome by the user apparatus 10 according to the first embodiment of the present invention is described with reference to FIGS. 1 to 3.

In the user apparatus 10, the PMI information selected at the PMI selecting and the CQI estimating unit 112 (FIG. 1) is input to the PMI accumulating unit for demodulation 116 with a predetermined delay amount (T+2Δ) using the delay circuit 114. In other words, in FIG. 2, the PMI1 is stored in the PMI accumulating unit at the time (t1) the PMI1 is fed back from the user apparatus, whereas, as shown in FIG. 3, in the user apparatus 10 according to an embodiment of the present invention, the PMI1 is stored in the PMI accumulating unit for demodulation 116 with the predetermined delay amount (T+2Δ) from the time t1. Moreover, that the PMI information is to be changed from the PMI1 to the PMI2 is detected by the PMI selecting and CQI estimating unit 112 of the user apparatus 10, and the PMI information within the PMI accumulating unit for demodulation 116 is updated to the PMI2 with a delay of a predetermined delay amount (a delay of T+2Δ from t7) also in case of feeding back the PMI2 to the base station.

Figure 3:
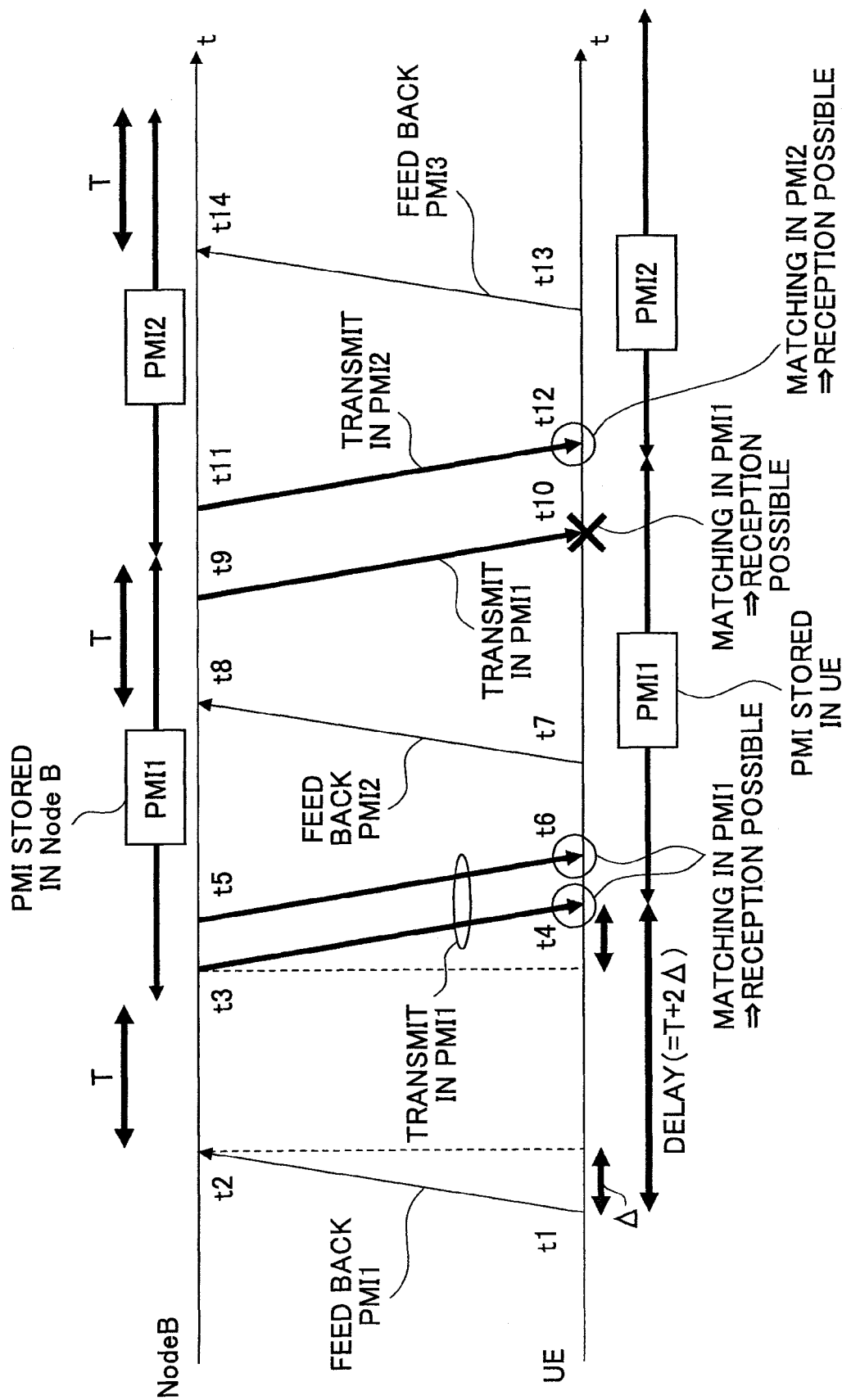
FIG. 3 is a time chart schematically illustrating communications between the user apparatus and the base station in FIG. 1.

With reference to FIGS. 2 and 3, when the base station transmits a signal to the user apparatus 10 at a time t9, the update to the PMI2 has not been completed at the time t9. With reference to FIG. 3, at a time t10 at which the user apparatus receives the signal, the PMI accumulating unit 116 for demodulation within the user apparatus 10 stores the PMI1. This is because, due to the delay circuit 114, a delay of T+2Δ occurs without an immediate update to the PMI2 at the time the user apparatus 10 fed back the PMI2. Thus, there is a match between the PMI1 used by the base station and the PMI1 stored by the PMI accumulating unit for demodulation 116 of the user apparatus 10, making it possible to conduct reception properly at the user apparatus 10. In this way, according to the user apparatus 10 of the present embodiment, even when the base station which received an update of the PMI information conducts transmission using the PMI information before the update even when the process for the update has not been completed, PMI information may match between the base station and the user apparatus, thus making it possible to prevent a communications failure due to unmatched PMI information.

A time T which is required for PMI information decoding, etc., may be predetermined as a certain value between the base station and the user apparatus, or may be reported from the base station to the user apparatus using high-layer signaling, for example, as it may change due to an amount of signal processing at the base station. Moreover, the propagation delay Δ of the signal may be calculated based on a frame number of a sub-band used for feeding back the PMI information. In FIGS. 2 and 3, the propagation delay Δ is arranged to be the same in both uplink transmission and downlink transmission for convenience, but they may be arranged to be different.

Second Embodiment

Next, the base station according to a second embodiment of the present invention is described with reference to FIG. 4.

Figure 4:
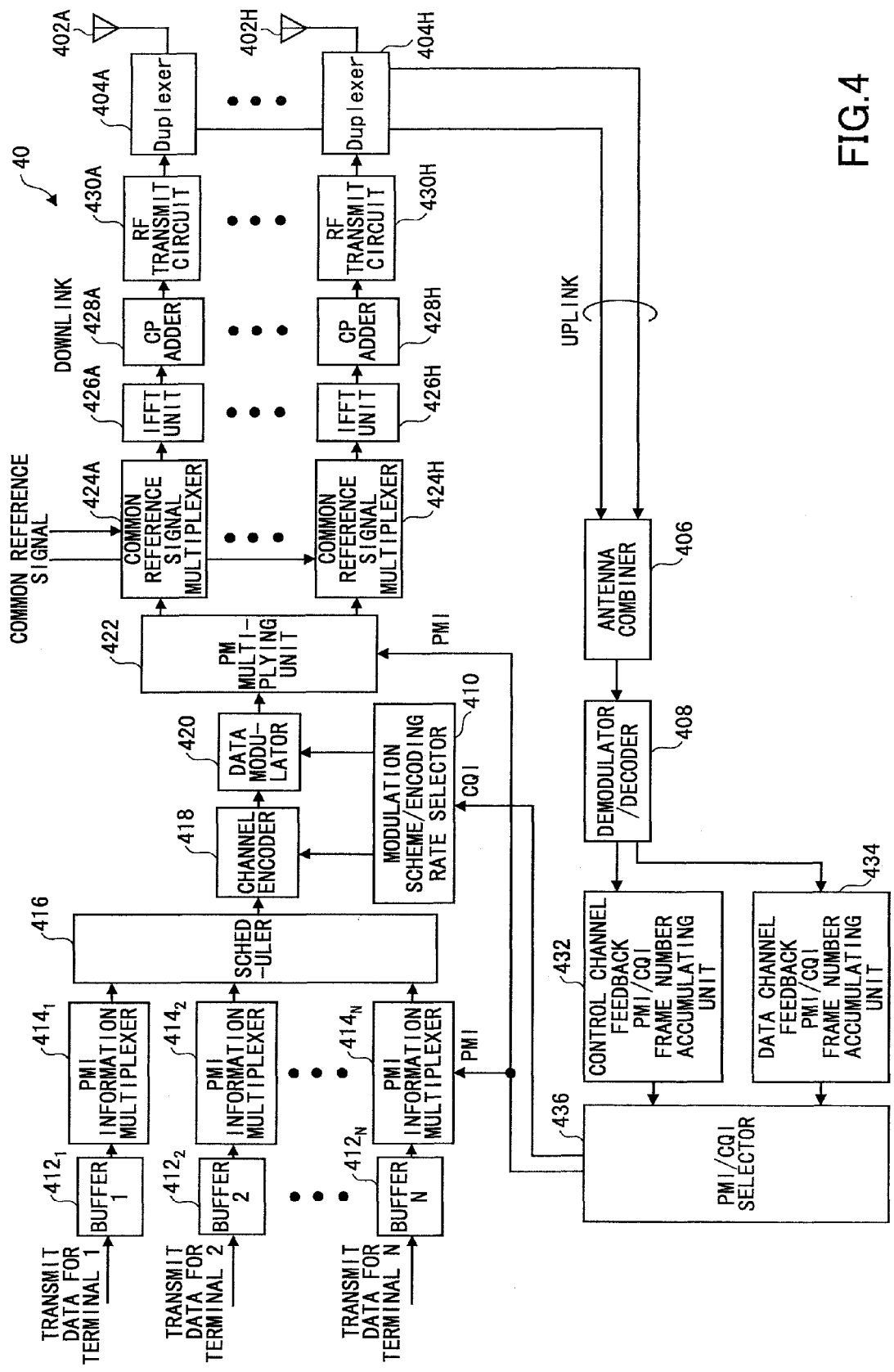
FIG. 4 is an overview configuration diagram of the base station according to a second embodiment of the present invention.

FIG. 4 is a schematic diagram illustrating a configuration of the base station according to the second embodiment of the present invention. As shown, the base station 40 is arranged as an 8-antenna system having eight antennas 402A-402H. The base station 40 has N buffers $412_1$-$412_N$, N PMI information multiplexers $414_1$-$414_N$, a scheduler 416, a channel encoder 418, a data modulator 420, a pre-encoding matrix (PM) multiplying unit 422, common reference signal multiplexers 424A-424H, inverse fast Fourier transform (IFFT) units 426A-426H, CP adders 428A-428H, RF transmit circuits 430A-430H, duplexers 404A-404H, an antenna combiner 406, a demodulator/decoder 408, a control channel feedback PMI and frame number accumulating unit 432, a data channel feedback PMI and frame number accumulating unit 434, and a PMI/CQI selector 436.

The buffers $412_1$-$412_N$ store transmit data to be transmitted to corresponding N user apparatuses (not shown) that reside within a cell of the base station 40.

The PMI information multiplexers $414_1$-$414_N$ are respectively connected to the N buffers $411_1$-$412_N$ and take, as inputs, corresponding transmit data sets. Moreover, the PMI information multiplexers $414_1$-$414_N$ take, as inputs, the PMI information sets from the below-described PMI/CQI selector 436 and multiplexes them into shared data channels of transmit data respectively input from the buffers $412_1$-$412_N$ to generate transmit signals corresponding to the user apparatuses.

The modulation scheme/encoding rate selector 410 takes, as an input, a CQI from the below-described PMI and CQI selector 436, and, based on the CQI, selects a modulation scheme and encoding rate which are optimal for transmission from the base station 40 to the user apparatus. Based on the result of the selection, the modulation scheme/encoding rate selector 410 generates modulation method information which indicates the selected modulation method and outputs modulation method information to the data modulator 420. Moreover, based on the result of the selection, the modulation scheme/encoding rate selector 410 generates scheme information which indicates the selected channel encoding scheme, and outputs the scheme information to the channel encoder 418.

The scheduler 416 takes, as inputs, transmit signals from the PMI information multiplexers $414_1$-$414_N$ that are to be respectively transmitted to N user apparatuses, and allocates a radio resource to each of the transmit signals.

The channel encoder 418 takes, as an input, a transmit signal from the scheduler 416 and takes, as an input, scheme information indicating a channel encoding scheme from the modulation scheme/encoding rate selector 410. Moreover, the channel encoder 418 performs channel encoding on the transmit signal using the scheme indicated in the scheme information. Moreover, the channel encoder 418 outputs the channel-encoded transmit signal to the data modulator 420.

The data modulator 420 takes, as an input, the channel-encoded transmit signal from the channel encoder 418, and takes, as an input, modulation scheme information indicating the modulation scheme from the modulation scheme/encoding rate selector 410 into the data modulator 420. Moreover, the data modulator 420 modulates the input transmit signal with the modulation scheme indicated in the modulation scheme information. Furthermore, the data modulator 420 outputs the modulated transmit signal to the PM multiplying unit 422.

The PM multiplying unit 422 takes, as an input, the modulated signal from the data modulator 420, and duplicates the input signal to generate eight transmit signals, the number of which is the same as the number of antennas. In other words, eight transmit signals to be transmitted from the corresponding eight antennas 402A-402H are generated. In other words, the PM multiplying unit 422 has a function of a splitter. Moreover, the PM multiplying unit 422 takes, as an input, PMI information from the PMI/CQI selector 436, and multiplies a pre-encoding matrix with the transmit signal generated. In this way, the shared data channel is transmitted from the eight antennas 402A-402H using a directional beam having a strong directivity in a direction at which a user apparatus to be transmitted to is located.

Each of the eight transmit signals to which the pre-encoding matrix is multiplied that is generated by the PM multiplying unit 422 is then output to the common reference signal multiplexers 424A-424H. The common reference signal multiplexers 424A-424H multiplex a common reference signal with the corresponding transmit signals taken from the PM multiplying unit 422 as inputs, and output the transmit signals obtained by the multiplexing to corresponding IFFT units 426A-426H.

The IFFT units 426A-426H inverse fast Fourier transform transmit signals respectively taken as inputs from the common reference signal multiplexers 424A-424H, and output the transformed respective transmit signals to CP adders 428A-428H. The CP adders 428A-428H add cyclic prefixes (CPs) to the input signals and output the respective CP-added transmit signals to the RF transmit circuits 430A-430H. The RF transmit circuits 430A-430H perform processes (digital-analog conversion, bandwidth limiting, power amplification, etc.) for transmitting the corresponding input signals. The processed signals are transmitted from the antennas 402A-402H via respective duplexers 404A-404H.

The above-described series of elements from the buffers $412_1$-$412_N$ to the RF transmit circuits 430A-430H constitutes an output section of the base station 40. Next, elements which constitute a receiver are explained. In the following explanation, a case is illustrated of transmitting from one user apparatus.

The antenna combiner 406 takes, as an input from each of antennas 402A to 402H, a signal transmitted from the user apparatus (a received signal for the base station 40) via the duplexers 404A to 404H. Moreover, the antenna combiner 406 combines the signals and outputs the combined signal to the demodulator/decoder 408.

Using a predetermined demodulating and decoding method, the demodulator/decoder 408 demodulates/decodes the combined signal taken as an input from the antenna combiner 406. Moreover, the demodulator/decoder 408 extracts, from the demodulated/decoded signal, PMI information fed back using a physical uplink control channel (PUCCH), CQI corresponding to the PMI information, and a frame number of a frame used in the feedback (in other words, a feedback time), PMI information fed back using a physical uplink data channel (PUSCH), CQI corresponding to the PMI information, and a frame number of a frame used in the feedback. Moreover, the demodulator/decoder 408 outputs the PUCCH PMI information, the CQI, and the frame number to the control channel feedback PMI/CQI/frame number accumulating unit 432 (below called the accumulating unit 432), and outputs the PUSCH PMI information, the CQI, and the frame number to the data channel feedback PMI/CQI/frame number accumulating unit 434 (below called the accumulating unit 434).

The accumulating unit 432 takes, as inputs, the control channel (PUCCH) PMI information, the CQI, and the frame number from the demodulator/decoder 408 and stores the same. Moreover, the accumulating unit 432 may output the stored PUCCH PMI information, CQI, and frame number to the PMI/CQI selector 436.

The accumulating unit 434 takes, as inputs, the data channel (PUSCH) PMI information, the CQI, and the frame number from the demodulator/decoder 408 and stores the same. Moreover, the accumulating unit 434 may output the stored PUSCH PMI information, CQI, and frame number to the PMI/CQI selector 436.

The PMI/CQI selector 436 takes, as inputs, the control channel (PUCCH) PMI information, the CQI, and the frame number from the accumulating unit 432. Moreover, the PMI/CQI selector 436 takes, as inputs, the data channel (PUSCH) PMI information, the CQI, and the frame number from the accumulating unit 434. Furthermore, the PMI/CQI selector 436 may select which PMI information to be used based on the input PMI information and frame number. This selection is to be described below.

Moreover, the PMI/CQI selector 436 outputs the selected PMI information to the PMI multiplexers 414₁-414ₙ and the PM multiplying unit 422, and outputs the CQI corresponding to the selected PMI information to the modulation scheme/encoding rate selector 410.

Figure 5:
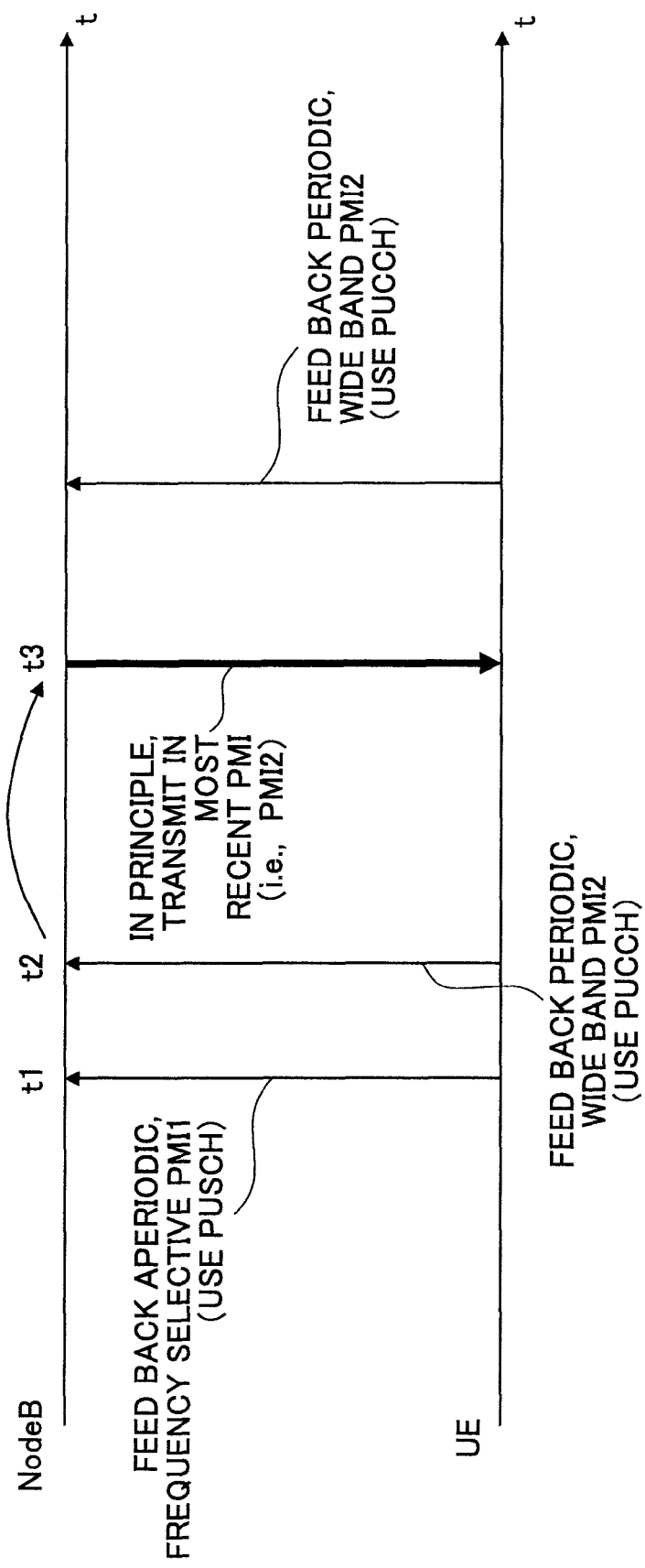
FIG. 5 is a time chart schematically illustrating communications between the user apparatus and the base station.
Figure 6:
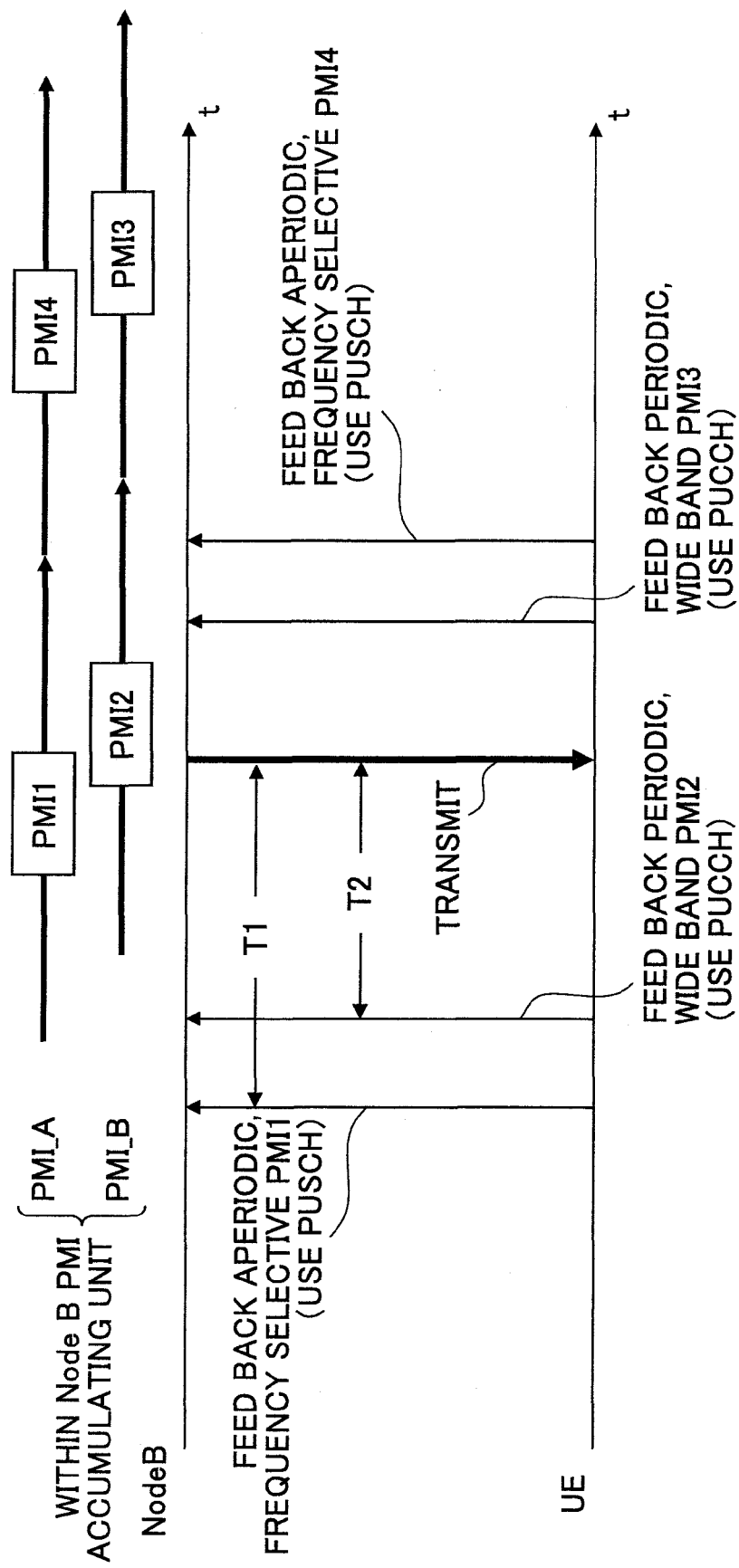
FIG. 6 is a time chart schematically illustrating communications between the user apparatus and the base station in FIG. 4.

Next, one example of communications between the user apparatus and a base station 40 according to a second embodiment of the present invention is described. For comparison, transmission and reception in a pre-encoding MIMO system between the base station and a user apparatus not having the feature of the user apparatus 10 is described with reference to FIG. 5. In FIGS. 5 and 6 to be referred to in the explanation below, a propagation delay A of a signal is ignored. Moreover, the base station (the base station 40) is to follow PMI information fed back from the user apparatus. Furthermore, a user apparatus in communication with a base station (a base station 40) may be a user apparatus 10 according to a first embodiment.

With reference to FIG. 5, the user apparatus (UE) feeds back aperiodic frequency selective PMI1 using PUSCH at a time t1. In other words, a request is made from a base station to feed back PMI information including PMI information on a predetermined sub-band, and, in response to the request, the PMI information is fed back at the time t1.

Moreover, at a time t2, which is immediately after the time t1, the user apparatus feeds back a wideband PMI2 (which is common to the whole bandwidth) as a feedback of periodic PMI information using the PUCCH. In other words, in the example shown, it is agreed on between the user apparatus and the base station to feed back wideband PMI information at a certain period using the PUCCH, and a feedback in accordance with the agreement is performed at the time t2. Upon receiving the PMI2, the base station performs a predetermined process to obtain the PMI2 and update PMI information of the PMI1 accumulating unit to the PMI2.

Thereafter, at the time t3, when the base station transmits a signal to the user apparatus, the base station uses PMI information updated. In other words, as a general rule, the most recent PMI information is used. In the example shown, the PMI2 is used, but frequency selective PMI information which uses the PUSCH requested by the base station is not used. Therefore, a problem occurs such that, despite the fact that the base station has requested the frequency selective PMI information, it cannot use the same, and, therefore, a more optimal weighting cannot be performed.

According to a base station 40 according to the second embodiment of the present invention, such a problem is overcome as follows. With reference to FIG. 6, the PMI1, which is fed back at a time t1 and is fed back using the PUSCH, is stored in the accumulating unit 434 (FIG. 4) as PMI-A. Moreover, a frame number of a frame used in feeding back the PMI1 is also stored in the accumulating unit 434.

Thereafter, at the time t2, the PMI2 fed back using the PUCCH is stored as PMI-B in the accumulating unit 432 (FIG. 4). Moreover, the frame number of the frame used in feeding back the PMI2 is also stored in the accumulating unit 432.

Next, when the base station 40 transmits a signal to a user apparatus at the time t3, PMI information selected at the PMI/CQI selector 436 is used. This selection is performed as follows, for example. First, in the PMI/CQI selector 436, T1, which is an elapsed time between a time at which the PMI1 is fed back and a data transmitting time (a downlink transmitting time), and T2, which is an elapsed time between a time at which the PMI2 is fed back and a data transmitting time are calculated. Such a calculation as described above may be performed from a frame number from the accumulators 432 and 434. Next, an L value expressed as $$L = a^{T1} - b^{T2} \quad (0 < a < 1, 0 < b < 1) \quad \text{Equation (1)}$$

is calculated. Next, whether an L value is 0 or more is determined; if it is 0 or more, PMI-A is selected; and if it is less than 0, PMI-B is selected. Here, a and b are forgetting factors. (They may be determined appropriately in accordance with radio propagation conditions, for example.) According to such a selection, even if feedback of the PMI1 throughout the PUSCH precedes feedback of the PMI2 throughout the PUCCH, the feedback of the PMI1 may be used preferentially. When using the PUSCH, the user apparatus can feed back frequency selective PMI (PMI for each sub-band) information) as PMI-A, and the base station 40 can perform more appropriate scheduling by utilizing the same.

As described above, even when feedback of the frequency selective PMI information using the PUSCH precedes feedback of the PMI information common to the whole bandwidth that uses the PUSCH, the base station 40 according to the present embodiment makes it possible to preferentially use the PMI information fed back through the PUSCH relative to most recent information fed back through the PUCCH when the time difference is small and the radio propagation condition does not change significantly. Moreover, when the time difference is large, and it is anticipated that the radio propagation condition has changed significantly, the most recent PMI information may also be used. Therefore, the base station 40 according to the present embodiment achieves an advantage which makes it possible to perform more suitable scheduling.

PMI information to be used may be selected based on a difference between T1 and T2. For example, when T1>T2, and T2-T1 is no more than a predetermined time, PMI-A may be used, not PMI-B. In other words, when PMI-B is received immediately after receiving PMI-A and the time difference between the two is short, it is anticipated that the propagation environment between the base station and the user apparatus has not changed much; thus, it is preferable not to use a (e.g., wide band) PMI-B which is fed back via the PUCCH, but to use a (e.g., frequency selective) PMI-A which is fed back via the PUSCH.

Moreover, the elapsed times T1 and T2 have been calculated from the frame number of the frame used in the PMI information feedback; however it is not limited to this, so that a time at which the base station recognizes reception of PMI information may be set as a starting time. In other words, any method may be used as long as it can be quantitatively determined as to which one of feedback of PMI information using the PUCCH and feedback of PMI information using the PUSCH precedes the other.

Moreover, an example is explained of preferentially treating PMI information fed back using the PUSCH. However, it is not limited to this, so that the PMI information fed back using the PUCCH may be treated preferentially when the feedback using the PUSCH is performed after the feedback using the PUCCH is used. This may be implemented as the base station 40 according to the second embodiment has the control channel feedback PMI/CQI/frame number accumulating unit 432 and the data channel feedback PMI/CQI/frame number accumulating unit 434 and stores the PMI information for each channel. The above also facilitates understanding the advantages of the mobile station 40 of the present embodiment.

The PMI information selected by the base station 40 may be reported explicitly to the user apparatus.

Third Embodiment

Figure 7:
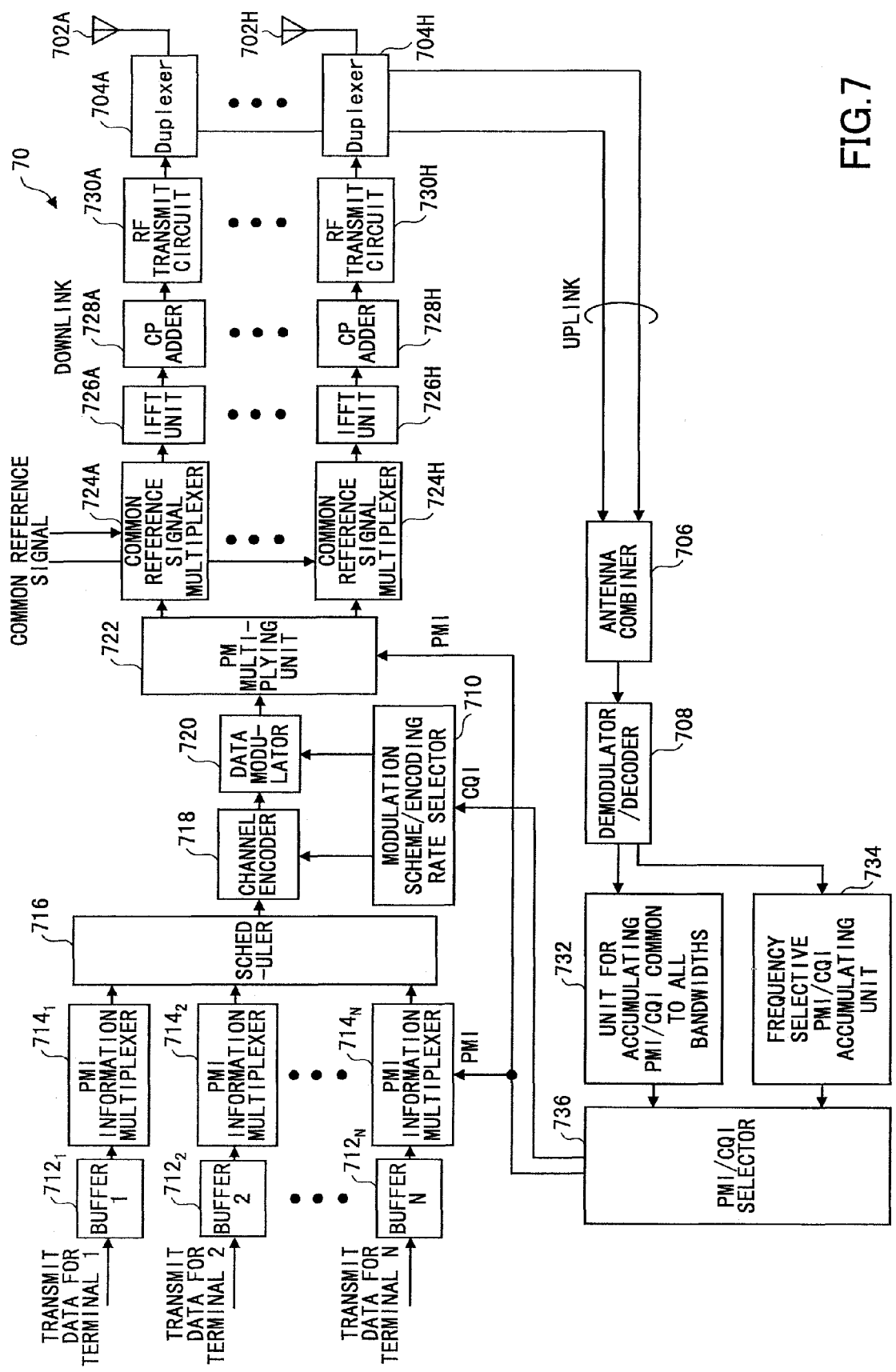
FIG. 7 is an overview configuration diagram of the base station according to a third embodiment of the present invention.

Next, the base station according to a third embodiment of the present invention is described with reference to FIG. 7. FIG. 7 is a schematic diagram illustrating a configuration of the base station according to the third embodiment of the present invention. As is evident from comparing FIG. 7 and FIG. 4, the base station 70 according to the third embodiment primarily differs from the base station 40 according to the second embodiment in that the base station 70 includes, in lieu of the control channel feedback PMI/CQI/frame number accumulating unit 432 and the data channel feedback PMI/frame number accumulating unit 434, a unit for accumulating PMI/CQI, common to the whole bandwidth 732 and a frequency-selective PMI/CQI accumulating unit 734. Below, an explanation of primarily the difference is provided.

Using a predetermined demodulating and decoding method, the demodulator/decoder 708 of the base station 70 demodulates/decodes the combined signal input from the antenna combiner 706. Moreover, the demodulator/decoder 708 extracts, from the demodulated and decoded signal, PMI information common to the whole bandwidth (wideband PMI information) that represents a channel quality of the overall system bandwidth, and average channel quality information (CQI) of a channel used in the feedback of the PMI information. Moreover, the demodulator/decoder 708 extracts frequency selective PMI information (PMI information for each sub-band) and an average CQI of a channel used in feeding back the PMI information.

Moreover, the demodulator/decoder 708 outputs, to the unit for accumulating PMI/CQI common to the whole bandwidth 732, information on PMI common to the whole bandwidth and an average CQI related thereto, and outputs, to the frequency-selective PMI/CQI accumulating unit 734, frequency-selective PMI information and an average CQI related thereto.

The unit for accumulating PMI/CQI common to the whole bandwidth 732 takes, as inputs, information on PMI common to the whole bandwidth and an average CQI related thereto and stores the same. Moreover, the unit for accumulating PMI/CQI common to the whole bandwidth 732 may output, to the PMI/CQI selector 736, the stored information on PMI common to the whole bandwidth and an average CQI related thereto.

The frequency-selective PMI/CQI accumulating unit 734 takes, as inputs, information on frequency-selective PMI and an average CQI related thereto and stores the same. Moreover, the frequency-selective PMI/CQI accumulating unit 734 may output, to the PMI/CQI selector 736, the stored frequency-selective PMI information and the average CQI related thereto.

The PMI/CQI selector 736 takes as inputs, from the unit for accumulating PMI/CQI common to the whole bandwidth 732, PMI information common to the whole bandwidth and an average CQI related thereto. Moreover, the PMI/CQI selector 736 takes as inputs, from the frequency selective PMI/CQI accumulating unit 734, frequency selective PMI information and an average CQI related thereto. Furthermore, the PMI/CQI selector 736 may select which one of information on PMI common to the whole bandwidth and frequency selective PMI information should be used based on the input two average CQIs.

For example, when a difference $$D = CQI_1 - CQI_2 \qquad \text{Equation (2)}$$

between an average CQI1 of a channel used for feeding back information on PMI common to the whole bandwidth and an average CQI2 of a channel used for feeding back frequency selective PMI information is no less than a predetermined value X, the PMI/CQI selector 736 selects information on PMI common to the whole bandwidth and, if it is less than the predetermined value X, it selects the frequency selective PMI information. The value X may be 0 dB, for example.

Moreover, the PMI/CQI selector 736 outputs selected PMI information to the PMI information multiplexers 714$_1$-714$_N$ and the PM multiplying unit 722, and the CQI corresponding to the selected PMI information to the modulation scheme/encoding rate selector 710.

In the base station 70 according to the present embodiment as configured in the above, in the PMI/CQI selector 736, two average CQIs are compared to select PMI information based on the result of the comparison. Therefore, for transmission from the base station 70 to the user apparatus, not only the most recent PMI information, but also PMI information fed back in a channel having a good radio propagation condition is used. As a result, the frequency of the user apparatus erroneously receiving PMI information used at the base station 70 decreases, reducing unmatched PMI information between the base station 70 and the user apparatus.

PMI information selected by the base station 70 may be reported explicitly to the user apparatus.

Fourth Embodiment

Next, the base station apparatus according to a fourth embodiment of the present invention is described. The base station according to the fourth embodiment primarily differs from the base station 40 according to the second embodiment in that a request timing of aperiodic PMI (preferably frequency-selective PMI) information feedback that is performed from the base station to the user apparatus is adjusted. Below an explanation of primarily the difference is provided.

When the base station 40 sends a request for feeding back aperiodic PMI information to the user apparatus, the scheduler 416 of the base station 40 adjusts a timing to transmit a request such that a feedback from a user apparatus which has responded to the request is performed within a predetermined timeframe including the timing of periodic feedback.

Figure 8:
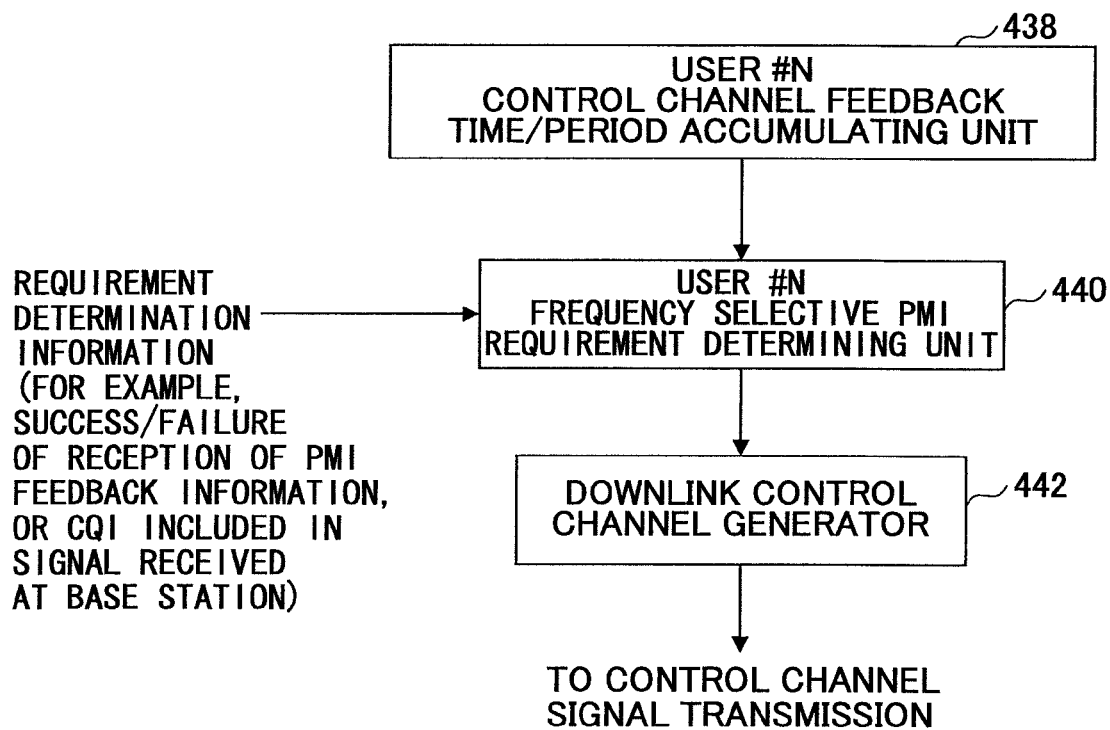
FIG. 8 is an overview configuration diagram of the base station according to a fourth embodiment of the present invention.

More specifically, as illustrated in FIG. 8, the base station 40 according to the present embodiment further includes a unit 438 for accumulating control channel feedback time/period for a user of a user number N, a unit 440 for determining aperiodic PMI feedback request for the same user, and a downlink control channel generator 442.

The control channel feedback time/period accumulator 438 accumulates a feedback time (period) for each user. This feedback time is determined when communications are started between the base station 40 and the user apparatus. The feedback request determining unit 440 determines, for example, whether feedback of aperiodic frequency selective PMI information using PUSCH should be requested from the user apparatus, for example, based on CQI included in the received signal, or success/failure in receiving the PMI information from the user apparatus. When the downlink control channel generator 442 determines that the feedback request determining unit 440 should make the request, it uses a UL grant to the user apparatus to request a feedback. Therefore, when a control channel is generated for a certain user at the base station 40, it is determined by the feedback request determining unit 440 as to whether aperiodic feedback of the PMI should be requested; if it is determined that it should be requested, a feedback time being accumulated in the control channel feedback time/period accumulating unit 438 corresponding to the user is referred to so as to perform a feedback request at an appropriate timing.

Figure 9:
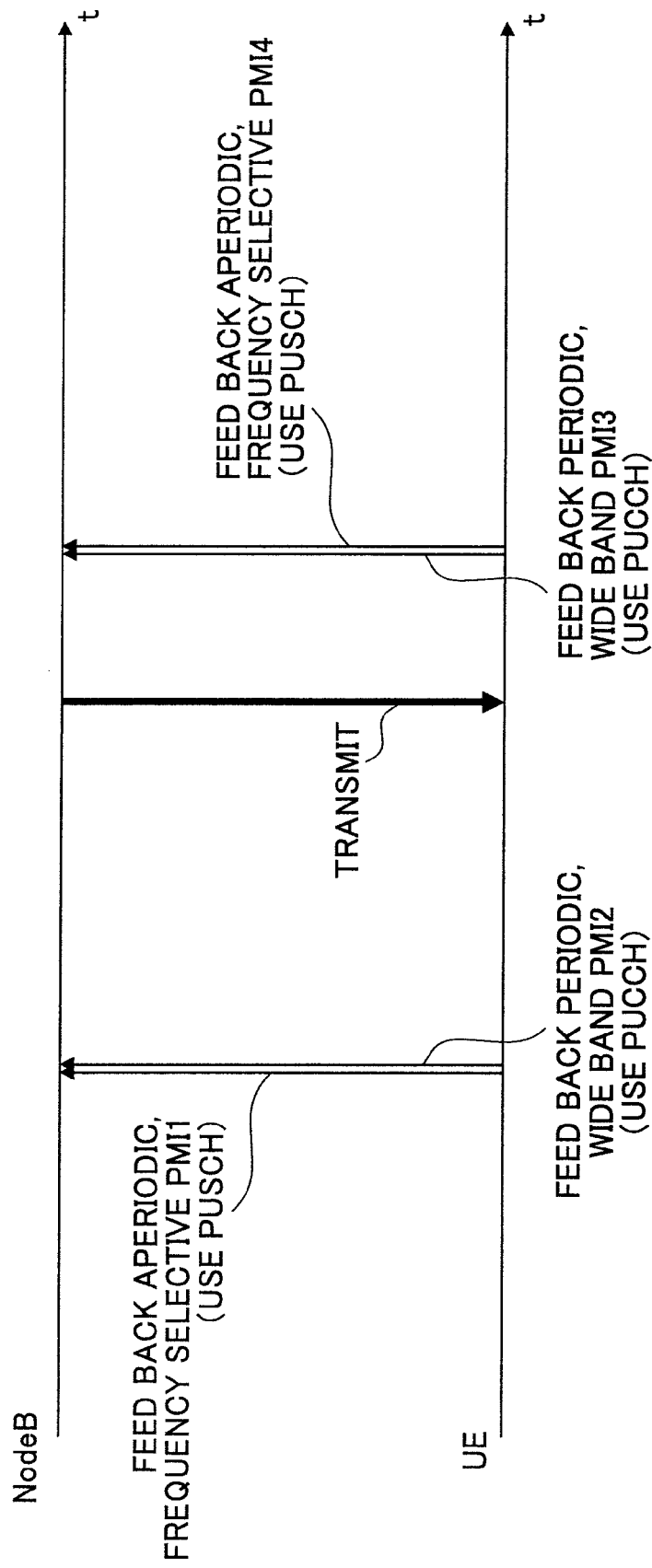
FIG. 9 is a time chart illustrating a communications method according to the fourth embodiment of the present invention.

Here, a predetermined timeframe may include zero, for example. In other words, as illustrated in FIG. 9, a periodic feedback and a feedback in response to a request may be performed at the same time. Moreover, a predetermined timeframe may be a range such that an L value becomes no less than zero in a determination based on Equation (1) using elapsed times T1 and T2 (FIG. 6). In this way, even when the base station requests for feedback of aperiodic PMI information and periodic PMI information feedback is performed afterward, PMI information using aperiodic feedback is used. In the aperiodic feedback, the frequency selective PMI information using PUSCH may normally be fed back, making it possible to treat such information preferentially to perform more suitable scheduling.

Moreover, when feedback of aperiodic PMI information is performed within a certain timeframe from a time at which periodic PMI information is fed back, for example, the fact that the PMI information using aperiodic feedback is treated preferentially is agreed on in advance between the base station 40 and the user apparatus.

The present invention has been described by breaking down into a number of embodiments for convenience of explanation. However, the breakdown of each of the embodiments is not essential to the present invention, so that two or more embodiments may be used as required.

The present international application claims priority based on Japanese Patent Application No. 2008-001665, filed on Jan. 8, 2008, the entire contents of which are hereby incorporated by reference.

The invention claimed is:

1. A user apparatus in a multi-input multi-output (MIMO) mobile communications system using pre-encoding, comprising:
   a PMI generator which generates a pre-encoding matrix indicator (PMI) which indicates a pre-encoding matrix to be used by a base station;
   a delay circuit which takes, as an input, the PMI and which outputs the PMI after a predetermined delay period has elapsed;
   an accumulating unit which takes, as an input, the PMI from the delay circuit and stores the input PMI; and
   a channel estimator which, on a signal from the base station, performs channel estimation using the PMI stored in the accumulating unit.

2. The user apparatus as claimed in claim 1, wherein the transmitter uses a PUSCH in order to feed back the PMI on a subband.

3. The user apparatus as claimed in claim 1, wherein the PMI generator generates a wideband PMI, and wherein the transmitter uses a PUCCH in order to feed back the wideband PMI.

4. The user apparatus as claimed in claim 1, further comprising:
   a receiver which receives a signal from the base station,
      wherein the signal received at the receiver includes information on whether it is according to PMI information fed back from the user apparatus.

5. The user apparatus as claimed in claim 4, wherein the predetermined delay period is provided from the base station to the delay circuit via a high-layer signaling.

6. A communications method in a MIMO mobile communications system using pre-encoding, comprising the steps of:
   generating a PMI which indicates a pre-encoding matrix to be used by a base station;
   storing the PMI after a predetermined delay period has elapsed; and
   performing, on a signal from the base station, channel estimation using the stored PMI.

7. A multi-input multi-output (MIMO) mobile communications system using pre-encoding, comprising:
   a base station apparatus which transmits a signal to which a pre-encoding matrix is multiplied; and
   a mobile station apparatus which receives a signal from the base station apparatus,
   wherein the mobile station apparatus includes a PMI generator which generates a pre-encoding matrix indicator (PMI) which indicates a pre-encoding matrix to be used by the base station apparatus;
   a delay circuit which takes, as an input, the PMI and which outputs the PMI after a predetermined delay period has elapsed;
   an accumulating unit which takes, as an input, the PMI from the delay circuit and stores the input PMI; and
   a channel estimator which, on a signal from the base station, performs channel estimation using the PMI stored in the accumulating unit.

8. A base station apparatus in a multi-input multi-output (MIMO) mobile communications system using pre-encoding, the base station apparatus comprising:
   a first accumulating unit which stores first PMI information fed back from a user apparatus using a physical uplink control channel; and
   a second accumulating unit which stores second PMI information fed back from the user apparatus using a physical uplink shared channel,
   wherein the user apparatus generates the first PMI information which indicates a pre-coding matrix to be used by the base station, stores the first PMI information after a predetermined delay period has elapsed, and performs, on a signal from the base station, channel estimation using the stored first PMI information.

9. The base station apparatus as claimed in claim 8, wherein the receiver receives a PUSCH which includes the PMI on a subband.

10. The base station apparatus as claimed in claim 8, wherein the receiver receives a PUCCH which includes a wideband PMI.

11. The base station apparatus as claimed in claim 8, wherein channel estimating is executed at a user apparatus on a signal transmitted from a transmitter using a PMI which is generated by the user apparatus and which has undergone a predetermined delay period.

12. The base station apparatus as claimed in claim 11, wherein the transmitter provides the predetermined delay period via a high-layer signaling.

13. A communications method in a multi-input multi-output (MIMO) mobile communications system using pre-encoding, comprising the steps of:
- storing, by a base station, first PMI information fed back from a user apparatus using a physical uplink control channel; and
- storing, by the base station, second PMI information fed back from the user apparatus using a physical uplink shared channel,
- wherein the user apparatus generates the first PMI information which indicates a pre-coding matrix to be used by the base station, stores the first PMI information after a predetermined delay period has elapsed, and performs, on a signal from the base station, channel estimation using the stored first PMI information.

\* \* \* \* \*